April 17, 1928.
J. H. LANE
1,666,624
ROTATABLE TOOL AND FEEDING MECHANISM THEREFOR
Filed Oct. 14, 1925
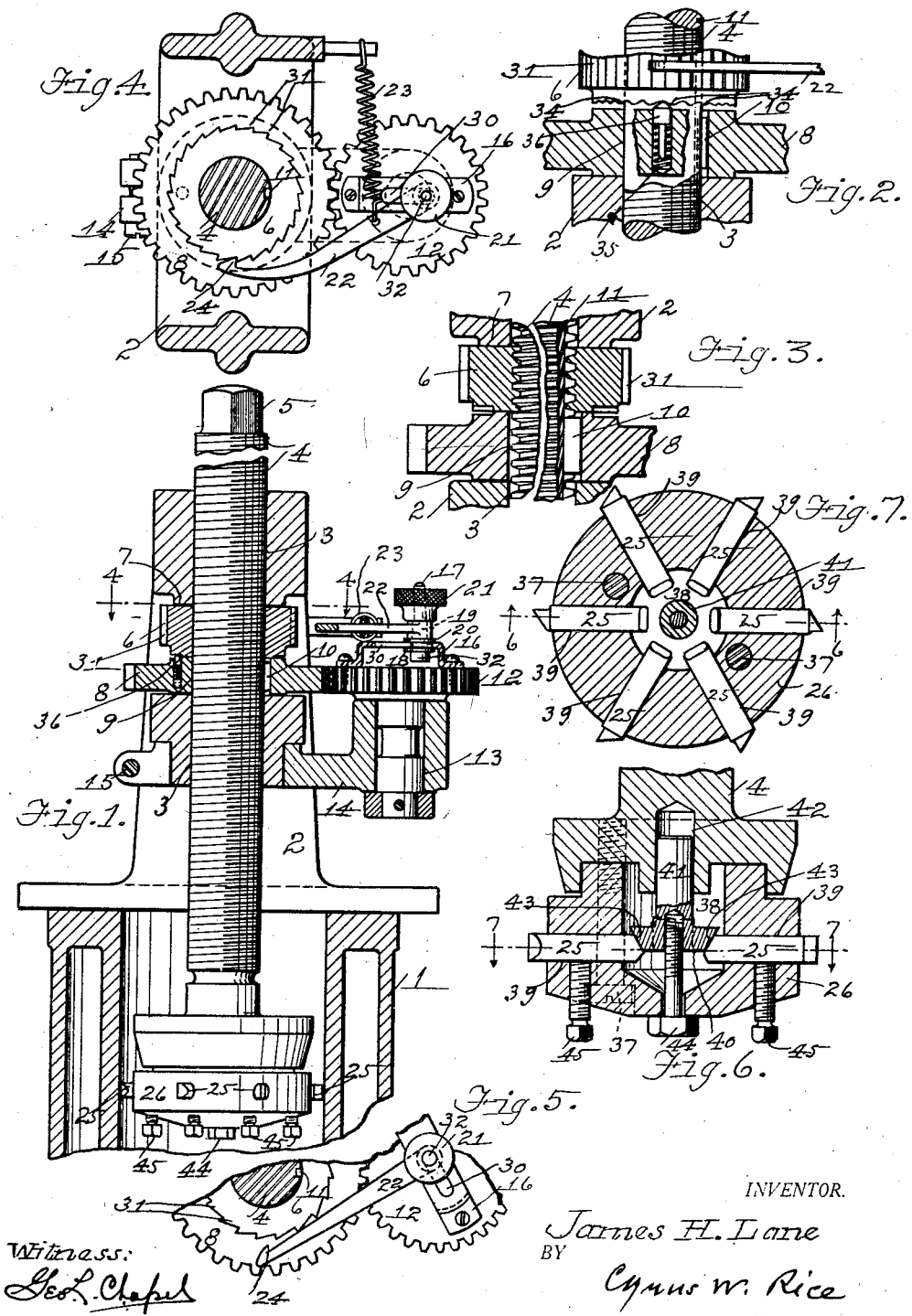
INVENTOR.
James H. Lane
BY
Cyrus W. Rice
ATTORNEY.

Patented Apr. 17, 1928.

1,666,624

UNITED STATES PATENT OFFICE.

JAMES H. LANE, OF BENTON HARBOR, MICHIGAN, ASSIGNOR OF ONE-HALF TO HENRY C. CAMPBELL, OF BENTON HARBOR, MICHIGAN.

ROTATABLE TOOL AND FEEDING MECHANISM THEREFOR.

Application filed October 14, 1925. Serial No. 62,371.

The present invention relates to rotatable tools and feeding mechanism therefor; and one of its objects is to provide an improved feeding means for such tools that will feed the same intermittently or at different speeds, another object being to provide improved means for centering the tools in the work.

These and any other objects hereinafter appearing are attained by, and the invention finds preferable embodiment in, the structure hereinafter particularly described and illustrated in the body of this specification and illustrated by the accompanying drawings, in which:—

Figure 1 is a longitudinal central sectional view of a structure embodying my invention and of an internal-combustion engine's cylinder being operated on thereby;

Figure 2 is a like view of certain parts of said structure;

Figure 3 is a like view of certain parts thereof;

Figure 4 is a transverse sectional view of certain parts of the structure, taken on line 4—4 of Figure 1;

Figure 5 is a top plan view of said parts showing a slightly modified construction.

Figure 6 is a longitudinal sectional view of a rotatable shaft and its tool-carrying head, taken on line 6—6 of Figure 7; and Figure 7 is a transverse sectional view of said head, taken on line 7—7 of Figure 6.

In the accompanying drawings is shown a rotary cutting tool applied, as by suitable clamps or other means (not shown), to the end of a cylinder 1 of an internal-combustion engine for resizing its interior. This device comprises a frame 2 in whose bearings 3 is rotated a shaft 4 by suitable power or means applied to its squared upper end 5. This shaft is threaded as shown and carries a feeding nut 6 held in axially non-movable relation to the frame by the frame's surface 7 against which this nut's upper side abuts. A member—the gear 8—has a central bore 9 through which the shaft passes, and a key 10 slidable in the shaft's keyway 11, so that said member 8 turns with the shaft and has an axial movement relative thereto. An element—the gear 12—is rotatably mounted at 13 on the frame, or (as shown) on a supporting collar 14 surrounding and clamped to the frame by a screw 15. This element or gear 12 is provided with a transversely-extending bar 16 having a slot or bearing 30 receiving the shank 17 of a spindle 32 having a flange 18 and carrying a collar 19 between whose flange 20 and said flange 18 the spindle may be clamped by the nut 21 on the threaded upper end of the shank 17 and bearing on said collar's upper end. A pawl 22 is mounted turnably on this collar and is spring-pressed at 23 to cause its catch or tooth 24 to engage the ratchet teeth 31 of the nut 6 and turn the same to feed the tools 25 carried by the head 26 at the lower end of the shaft.

It will be seen that, as the shaft 4 is rotated in tool-feeding direction, the tools will be slowly fed downwardly in the work (as the cylinder 1) whenever the nut 6 is held against turning with the shaft, but that such feeding will cease whenever this nut rotates with the shaft. The spindle 32 may be held in adjusted position in the slot or bearing 30 by screwing down the nut 21, and in such a position eccentric to the axis of the element or gear 12, as will, in the rotation of said element (meshing as it does with the gear 8) cause the feeding nut's teeth 31 to be engaged by the pawl to rotate said nut with the shaft and cause the feeding of the tools to cease in certain rotated positions of said element; and to cause said teeth to be disengaged from the pawl, thus causing the tools to feed in said element's opposite positions.

And further, it will be seen that the spindle 32 may be secured in such positions in the slot bearing 30 as will effect the constant feeding of the tools, but at different speeds during the oppositely turned positions respectively of said element 12.

The feeding nut 6 may be provided on its under side with spaced projections 34, disposed concentrically therewith, in which is pressed yieldingly by the spring 35 a plunger 36, so that the feeding nut 6 will turn with the gear member 8 except when the pawl engages the teeth 31 of said nut.

In Figure 4, the pawl is shown engaging the teeth 31, and in Figure 5, in position in which it is held from engaging the same. The straight shape of the pawl in Figure 5 serves to hold it more certainly out of such engagement.

In Figures 6 and 7 is particularly shown the head 26 detachably secured, as by screws 37, to the lower end of the shaft 4. This head has an axially extending bore 38 from which extend radially the bearings 39 in which slidably bear the tools 25. A disk 40 having a stem 41 slidably bearing in the shaft's axial bore 42 has an inclined periphery 43 engaging the inner ends of the tools. A screw 44 is journalled centrally of the head 26 and is threaded in the disk, so that the screwing down of this screw forces the tools outwardly and uniformly, thus centering the cutting operation of the mechanism in the work. Set screws 45 are adapted to clamp these tools in the position to which the screw 44 has moved them.

The invention being intended to be pointed out in the claims, is not to be limited to or by details of construction of the particular embodiment thereof illustrated by the drawings or hereinbefore described.

I claim:

1. In mechanism of the character described: a frame; a tool-carrying threaded shaft rotatable on the frame; a feeding nut rotatable on the threaded shaft in axially non-movable relation to the frame; a member rotatable with, and axially movable relatively to, the shaft; an element rotatable by said member; a pawl mounted on said element eccentrically thereof and adapted to engage the nut and rotate the same in tool-feeding direction.

2. In mechanism of the character described: a frame, a tool-carrying threaded shaft rotatable on the frame; a feeding nut rotatable on the threaded shaft in axially non-movable relation to the frame; a member rotatable with, and axially movable relatively to, the shaft; an element rotatable by said member; a pawl mounted on said element adjustable-eccentrically thereof and adapted to engage the nut and rotate the same in tool-feeding direction.

3. In mechanism of the character described: a frame, a tool-carrying threaded shaft rotatable on the frame and having a keyway; a toothed feeding nut rotatable on the threaded shaft in axially non-movable relation to the frame: a gear on the shaft having a key slidable in said keyway; a rotatable gear element meshing with said gear; a pawl mounted on said element eccentrically thereof and adapted to engage the toothed feeding nut and rotate the same in tool-feeding direction.

4. In mechanism of the character described: a frame; a tool-carrying threaded shaft rotatable on the frame and having a keyway; a toothed feeding nut rotatable on the threaded shaft in axially non-movable relation to the frame; a gear on the shaft having a key slidable in said keyway; a rotatable gear element meshing with said gear; a pawl mounted on said element adjustable-eccentrically thereof and adapted to engage the toothed feeding nut and rotate the same in tool-feeding direction.

5. In mechanism of the character described: a frame; a tool-carrying threaded shaft rotatable on the frame; a feeding nut rotatable on the threaded shaft in axially non-movable relation to the frame; a member rotatable with, and axially movable relatively to, the shaft; an element rotatable by said member and having a transaxially-extending bearing; a pawl adjustably secured in said bearing and adapted to engage the nut and rotate the same in tool-feeding direction.

6. In mechanism of the character described: a frame; a tool-carrying threaded shaft rotatable on the frame; a feeding nut rotatable on the threaded shaft in axially non-movable relation to the frame; a member rotatable with, and axially movable relatively to, the shaft; an element rotatable by said member; a pawl mounted on said element eccentrically thereof and adapted to engage the nut and rotate the same in tool-feeding direction; yielding means for rotating the feeding nut by the rotation of said member.

In testimony whereof I have hereunto set my hand at Benton Harbor, Michigan, this 15th day of August, 1925.

JAMES H. LANE.